United States Patent [19]
Glassman

[11] 3,768,178
[45] Oct. 30, 1973

[54] EDUCATIONAL ARITHMETIC TOY WITH INTERCHANGEABLE NUMERALS

[76] Inventor: Stanley H. Glassman, 41 Harvest Ln., Commack, N.Y.

[22] Filed: Sept. 9, 1971

[21] Appl. No.: 178,951

Related U.S. Application Data

[63] Continuation-in-part of Ser. No. 105,363, Jan. 11, 1971.

[52] U.S. Cl. .................................. 35/31 G, 35/70
[51] Int. Cl. ...................... G09b 1/36, G09b 19/02
[58] Field of Search ............... 35/31 R, 31 D, 31 G, 35/69, 70, 71, 72, 73; 46/26

[56] References Cited
UNITED STATES PATENTS

| | | | |
|---|---|---|---|
| 3,235,975 | 2/1966 | Pierson | 35/73 X |
| 3,010,228 | 11/1961 | Torre | 35/73 |
| 1,472,536 | 10/1923 | Thomson | 35/69 |
| 3,094,792 | 6/1963 | Morgan et al. | 35/31 R |
| 3,229,388 | 1/1966 | Smith | 35/70 |
| 1,428,206 | 9/1922 | Benton | 35/72 |
| 1,895,611 | 1/1933 | Doak | 35/70 |

FOREIGN PATENTS OR APPLICATIONS

| | | | |
|---|---|---|---|
| 523,660 | 4/1921 | France | 46/26 |

Primary Examiner—Wm. H. Grieb
Attorney—Alfred Musumeci

[57] ABSTRACT

An educational manipulative toy useful as an aid in teaching arithmetic concepts is provided wherein a plurality of blocks may be stacked to provide a physical representation of an arithmetic relationship. Each of the blocks has a predetermined dimension which has a specific value relationship relative to a corresponding dimension of each of the other blocks, with the arithmetic relationship to be physically represented being exemplified by stacking the blocks so that the predetermined dimension of each block is arranged in a particular juxtaposition relative to the predetermined dimension of the other blocks. Indicia means, such as pegs having numbers or fractions imprinted thereon, are interchangeably mounted upon the blocks. Variation of the indicia means serves to vary these specific numerical values involved in a given arithmetic relationship. Thus, variation of specific numerical values may be accomplished merely by interchanging the indicia means without altering the relative juxtaposition of the blocks or the relative arithmetic relationship being displayed.

5 Claims, 8 Drawing Figures

PATENTED OCT 30 1973 3,768,178

INVENTOR.
STANLEY H. GLASSMAN
BY
ATTORNEY.

EDUCATIONAL ARITHMETIC TOY WITH INTERCHANGEABLE NUMERALS

The present invention is a continuation-in-part of my copending application Ser. No. 105,363, filed Jan. 11, 1971 and entitled Educational Arithmetic Manipulative Toy.

BACKGROUND OF THE INVENTION

1. Field of the Invention

The present invention relates to educational toys and more particularly to a manipulative aid for teaching arithmetic concepts and relationships. The invention is especially appropriate for use with young children, and may be advantageously effective in assisting visually or physically handicapped children. Also, the invention will be helpful in connection with teaching processes which involves retarded children or children who may be considered slow learners.

The invention is specifically concerned with arithmetic relationships and provides a visual manipulative device to assist in the learning and reinforcement of numbers concepts and arithmetic processes.

2. Discussion of the Prior Art

Teaching aids of the types to which the present invention relates should provide visual and physical representation of concepts to be taught in a vivid and effective manner. Generally, such devices should also be entertaining and amusing in their use and manipulation in order to attract and hold the interest of a child, thereby to inspire or motivate the child to pursue the learning process.

In this connection, simplicity of structure and operation should be effectively combined with graphicness in order for the device to be most advantageously effective. In many prior art devices, cumbersomeness and complexity make manipulation difficult thereby not only discouraging a child, but also failing to appropriately convey an effective representation of the concepts to be taught.

Structural simplicity offers an additional advantage in such devices in that the manufacturing cost, and consequently the selling price, may be gainfully minimized. Since such items are usually sold in either a general consumer market or to schools or other similar institutions, the price of the item will be of great significance in the commercial success and in the practical acceptability thereof.

An additional factor of importance in such devices is versatility. If a device were to provide interchangeability of parts without disadvantageously complicating the structure of the device, this would provide a feature of significant advantage. Then, the device could be adapted to display a wider variety of arithmetic ideas or concepts with a minimized number of parts, thereby further enhancing its effectiveness.

Accordingly, it will be seen that provision of an entertaining manipulative teaching aid which is simply structured to graphically convey arithmetic concepts and which may be successfully produced at a relatively low cost will entail a desirable forward step in the art of educational toys. It will be particularly advantageous if such a device also includes interchangeability of parts to increase and enhance the effectiveness of the device by the added feature of versatility with regard to the concepts which can be physically displayed and represented by the device.

SUMMARY OF THE INVENTION

Briefly, the present invention may be described as a manipulative arithmetic device comprising a plurality of blocks each having a predetermined dimension which has a specific value relationship relative to a corresponding dimension of each of the other of said plurality of blocks. The device also includes a plurality of indicia means each comprising a visible value designation which may be representative of said predetermined dimension of selected ones of said blocks. Means are also provided for interchangeably mounting the indicia means upon the blocks, with said blocks being stackable with said predetermined dimensions arranged relative to each other to provide a physical representation of an arithmetic relationship. The indicia means when mounted upon said blocks provide a specific numerical value for each of the blocks forming the arithmetic relationship to be represented. Interchangeability of said indicia means enables variation of each of the specific numerical values of the blocks and consequent variation of the specific numerical values involved in the arithmetic relationship to be physically represented by the blocks.

During utilization of the device, the specific numerical values involved in a given arithmetic relationship may be altered without altering the basic relative relationships of the concept to be displayed. This may be accomplished by retaining the blocks in a given stacked arrangement while appropriately interchanging the indicia means provided with each block.

BRIEF DESCRIPTION OF THE DRAWINGS

The present invention will be better understood by reference to the following detailed description of a preferred embodiment thereof taken in connection with the accompanying drawings wherein.

DETAILED DESCRIPTION OF THE PREFERRED EMBODIMENT

Figure 1:
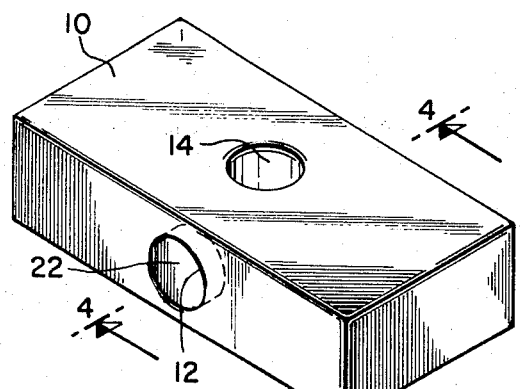
FIG. 1 is a view in perspective showing an exemplary one of the blocks of the device of the present invention.
Figure 4:
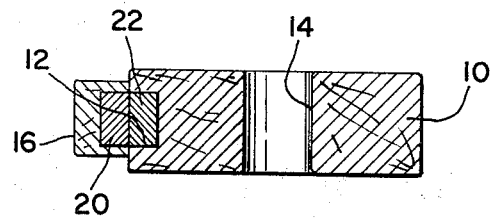
FIG. 4 is a sectional elevation of the block of FIG. 1 taken along the line 4—4 showing an attached numeral peg.

Referring now in detail to the drawing, there is shown in FIG. 1 a block 10 which exemplifies the plurality of such blocks which comprise a part of the present invention. The block 10 comprises an opening 12 having a magnetic member 22 embedded therein and an opening 14, but it is the opening 12 and the magnetic member 22 which are of primary significance for the purposes of the present application. The opening 14, as best seen in FIG. 4, is cylindrical in configuration and extends vertically through the block 10. The purpose of the opening 14 is to permit a plurality of blocks such as the block 10 to be stacked in the manner depicted in FIG. 8, which is in accordance with the teachings of copending application Ser. No. 105,363, with vertically extending pegs placed within the opening 14 of extend through a plurality of stacked blocks. The structure and operation of this alternative embodiment will be described in more detail hereinafter, but it should be noted that it is not essential for the purposes of the basic concept of the present application to include in the blocks 10 openings such as the opening 14 or vertically extending pegs.

Figures 2, 3:
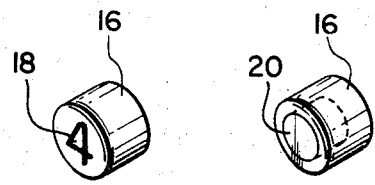
FIGS. 2 and 3 are views in perspective showing, respectively, two opposite ends of indicia means exemplary of those which may be used with the blocks of the invention.

The basic concept of the present invention is exemplified by the structural embodiment which includes the block 10 with opening 12 having the magnetic member 22 embedded therein, and indicia means such as the numeral pegs 16, an exemplary one of which is depicted in FIGS. 2 and 3. As shown in FIG. 2, the numeral peg 16 contains on its front face a numerical designation 18, which in the case of the embodiment depicted in FIG. 2 comprises the number "4." The numeral peg 16 may be attached to the block 10 with the numerical designation 18 in view thereby applying to the block 10 the numerical value "4." Peg 16 may be removably secured upon the block 10 and it may be replaced with another similar numeral peg, therey enabling different numerical values to be assigned and displayed upon the block 10 in a manner to be more fully described hereinafter.

FIG. 3 shows the numeral peg 16 in a position reversed from that shown in FIG 2. Where FIG. 2 depicts the front face of the numeral peg 16 containing the numerical designation 18, FIG. 3 shows the rear face of the numeral peg 16 which comprises a magnetic member 20 which is embedded to extend into the body of the numeral peg 16, in much the same manner as the magnetic member 22 is embedded in the block 10. When the magnetic member 20 is brought into contact with the magnetic member 22, they will cooperate in a manner well known to those skilled in the art to apply a magnetic force which will releasably retain the numeral peg 16 upon the block 10. Of course, it should be understood that although both members 20 and 22 are referred to as "magnetic" one will be a permanent magnet and the other of metallic material, as is common in devices of this type. Thus, when it is desired to apply a particular numerical value to the block 10, it is merely necessary to attach a numeral peg 16 onto the block 10, as shown in FIG. 4, so that the members 20 and 22 become magnetically engaged whereby to retain the numeral peg 16 upon the block 10 with the numerical designation 18 contained upon the front face of the numeral peg 16 being exposed to view. When it is desired to change the specific numerical designation of a block 10, it is merely necessary to remove the numeral peg 16 from the block 10. Replacement of the numeral peg 16 by another peg containing a different numerical designation 18 will enable variation of the numerical value assigned to the block 10.

Figure 5:
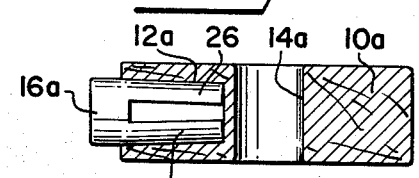
FIG. 5 is a sectional elevation of a block and indicia means, similar to those displayed in FIGS. 1-4, depicting an alternative embodiment for the present invention.

An alternative embodiment for releasably mounting the numeral peg of the present invention upon the blocks is depicted in FIG. 5. In the alternative embodiment of FIG. 5, the magnetic means, embodied by the magnetic members 20 and 22, are replaced by frictional means. In FIG. 5 there is depicted a numeral peg 16a having a forked configuration embodied in a pair of tangs 24 and 26. The numeral peg 16 is dimensioned so that when the tangs 24 and 26 are inserted into the opening 12 a in block 10a, tangs 24 and 26 will be slightly deflected toward each other thereby enabling the numeral peg 16a to be held within the opening 12 a by frictional force created when the user applies a slight pressure inserting the numeral peg 16a into the opening 12a. As shown, the numeral peg 16a will protrude slightly from the front face of the opening 12a thereby enabling it to be gripped for easy removal. The elements of the present invention may be fabricated from light or soft wood, and it will therefore be apparent that the materials utilized will inherently comprise sufficient resiliency to allow the creation of the frictional force described in connection with the embodiment of FIG. 5.

Figure 6:
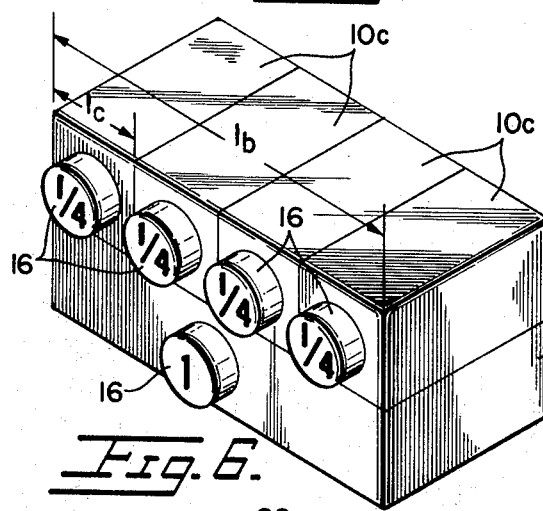
FIG. 6 is a view in perspective showing component parts of the present invention in a particular stacked arrangement physically representing a desired arithmetic concept.

FIG. 6 depicts the manner whereby the present invention may be utilized to physically represent an arithmetic relationship. A stack of blocks, comprising a larger lower block 10b and four equally sized upper blocks 10c, is arranged to physically represent the arithmetic relationship between any given value and four equal component parts whose sum equals said given value. In order to depict the desired arithmetic concept, the blocks must be stacked with a particular predetermined dimension of each block juxtaposed in a specific relationship relative to a similar or corresponding predetermined dimension of each of the other blocks. In the arrangement depicted in FIG. 6, the predetermined dimension referred to is the length $l_b$ of the block 10b and the length $l_c$ of the blocks 10c. Of course, it will be clear that any dimension, e.g. length, width, depth, etc., of a particular block or group of blocks may be chosen as the predetermined dimension, but it is necessary that the particular dimension which is chosen bear a relationship to a similar or corresponding predetermined dimension of each of the other blocks such as to enable the blocks to be assembled to depict the desired arithmetic relationship. It will be apparent that each of the blocks 10c comprises a dimension $l_c$ which is equivalent. Furthermore, it will be apparent that the dimension $l_c$ is one-fourth as large as the dimension $l_b$. Therefore, by placing four of the blocks 10c atop the block 10b with each of the dimensions $l_c$ aligned with the dimension $l_b$, there will be physically represented the concept that the arithmetic value represented by $l_b$ is four times as large as the value represented by $l_c$. Thus, the arithmetic concept of a whole being equal to the sum of its parts, in this case there being four parts, is physically represented.

In the particular example shown in FIG. 6, the block 10b is given the value "1" and the four blocks 10c are given the value "1/4 ". However, it will be obvious that these specific numerical values can be interchanged, so long as the basic relationship of four-to-one is maintained. In FIG. 6, each of the blocks 10c is shown with a numerical peg 16, containing the fraction "¼" on its face, attached thereto. The block 10b has attached thereto a numeral peg 16 which contains the number "1" on its face. Each of the pegs 16 shown in FIG. 6 are similar to the pegs shown in FIGS. 2 and 3. That is, each of the blocks 10c and 10b comprise metallic magnetic members 22 (not shown) which engaged magnetic members 20 (now shown) fixed to the numeral pegs, in the manner previously described. As seen from FIG. 6, each of the numeral pegs 16 may be readily grasped by a user and removed from the blocks 10b and 10c. After this has been accomplished, other numeral pegs containing different numerical values may be substituted therefor, in a manner which maintains the basic four-to-one relationship. This is depicted in FIG. 7.

Figure 7:
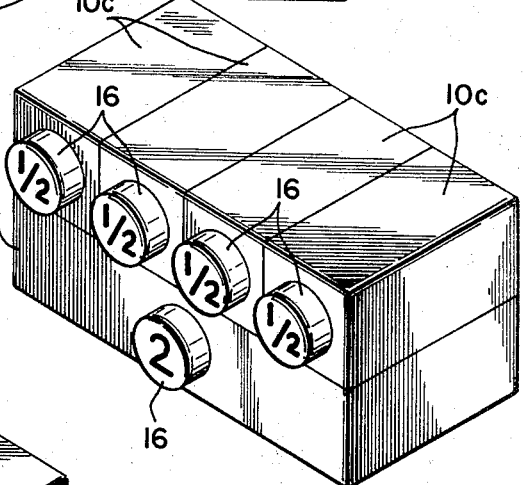
FIG. 7 is a view in perspective showing the stacked block arrangement of FIG. 6 with different indicia means being provided to exemplify the manner whereby a particular stacked arrangement of blocks may be retained with the indicia means being varied to alter the numerical values involved without altering the relative arithmetic relationships to be represented.

It will be noted that in FIG. 7 each of the numeral pegs 16 which are attached to the blocks 10c have been replaced with pegs comprising the numerical values "½" on their faces. The numeral peg 16 for the block 10b has been replaced with a numeral peg containing the numerical value "2" on its face. Thus, the value of each of the blocks 10b and 10c has been doubled merely by the interchangeability of the numeral pegs 16 while enabling retention of the basic arithmetic relationship of four-to-one which is physically represented by the stacked blocks.

It will be apparent that many other arithmetic relationships may be physically represented by a wide variety of stacked block arrangements utilizing numeral peg 16 of various numerical values. Thus, the present invention may be provided in kit form with any number and variety of blocks 10 and numeral pegs 16, each of which may be interchanged to provide stacked arrangements physically representing a variety of arithmetic relationships to which may be assigned a selected variety of numerical values.

Figure 8:
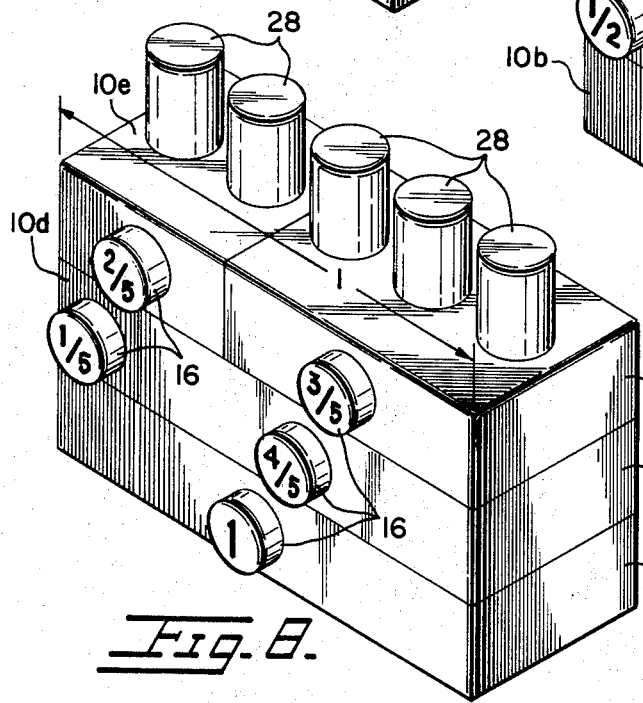
FIG. 8 is a view in perspective showing an alternative embodiment of the present invention wherein vertically extending pegs may be used with the blocks and indicia means of the present invention, in accordance with copending application Ser. No. 105,363.

FIG. 8 depicts the manner whereby the interchangeable numeral pegs 16 of the present application may be utilized in blocks which also utilize vertically extending pegs in the manner described in copending application Ser. No. 105,353. As is taught in said copending application, each of the blocks of a stack comprise openings such as the opening 14 of block 10 shown in FIG. 1. A particular block may have a number of openings depending upon the predetermined relevant dimension of the block. In said copending application, each of the blocks is assigned a specific fixed numerical value which is invariable and, accordingly, each of the blocks shown in said copending application comprises a number of vertical openings, such as the opening 14, equal to the numerical value assigned to said block. In the present application, since the numerical value of a particular block may be varied, it should be understood that the number of openings 14 which may be provided in a given block will not be determined by a particular invariable numerical value for that block. However, it will be noted that each of the blocks of the present application comprise a predetermined dimension, e.g. the dimensions $l_b$ and $l_c$, and that the predetermined dimension of each block is correlated in size to the predetermined dimensions of the other blocks of the device. Therefore, it will be apparent that in the arrangement of the present application, the block which contains the smallest predetermined dimension will comprise a single opening 14. Since each of the other blocks will comprise a predetermined dimension which is an integral multiple of the predetermined dimension of the smallest block, the number of openings 14 in the larger blocks will consequently be equivalent to the predetermined integral multiple by which the larger blocks are related to the smallest block in a set.

It will also be apparent that the blocks utilized in connection with the invention may be generally categorized into two types. One type is the type shown in FIGS. 1, 4 and 5, particularly labelled as block 10 and block 10a. This type of block will contain an opening 14 or 14a. A second type of block is that depicted in FIGS. 6 and 7 and identified by the reference characters 10b and 10c. This type of block will not contain an opening such as the opening 14. In FIG. 8 the blocks utilized are similar to the block types such as blocks 10 and 10a of FIGS. 1, 4 and 5. Thus, each of the blocks shown in FIG. 8 will comprise an opening 14 extending vertically therethrough.

The smallest of the blocks shown in FIG. 8 is the block labelled 10d which has attached thereto a numeral peg 16 comprising the numerical value "1/5". If it is assumed that block 10d is the smallest block of a set of blocks, then it will contain a single opening 14 (not shown) through which a vertical peg may extend. It is to be understood that each of the blocks shown in FIG. 8 will contain a number of openings 14 which is an integral multiple of the number of openings contained in the smallest block 10d. In each case this will be determined by a predetermined dimension taken across the front face of the block in a direction indicated by the general dimension labelled 1.

It will be seen that the stack of blocks shown in FIG. 8 comprises, in addition to the block 10d, four other blocks labelled 10e, 10f, 10g, and 10h. In addition, the stack of FIG. 8 includes five vertical pegs 28 which may be of a unitary length extending completely through the three tiers of blocks shown in FIG. 8. Alternatively, the pegs 28 may be made of a smaller size and, in accordance with the teachings of copending application, Ser. No. 105,363, they may be of a length which is a predetermined multiple of the height of the blocks. In such case, the pegs 29 shown in FIG. 8 will not extend completely through the three tiers of blocks shown, but will extend only part way therethrough, with other similar pegs 28 (not shown) extending through the balance of the distance to the lower surface of the bottommost block 10b. As stated, the particular dimensional relationship between the pegs 28 and the blocks 10d–10h may be in accordance with the teachings of application Ser. No. 105,363, and if such an alternative embodiment is to be utilized, the specific structural relationship involved may be better understood by reference to said copending application. It will be apparent that for the purposes of the present application, it is merely necessary to understand that vertical pegs such as pegs 28 may be utilized in combination with the interchangeable numeral pegs 16 to provide added structural rigidity to the stack of blocks as well as providing an additional physical indication of the arithmetic relationship involved, with the specific length of the pegs being chosen from any one of several possible alternative embodiments.

As seen from FIG. 8, the blocks 10d through 10h are assigned, respectively, numerical values "1/5," "2/5," "3/5," "4/5" and "1," these numerical values being represented by pegs 16 each containing on the face thereof the appropriate numerical designation. Thus, a particular arithmetic relationship between the first tier, represented by the block 10h, the second tier represented by the blocks 10d and 10g, and the third tier represented by the blocks 10e and 10f, is physically depicted.

It will be apparent that the arithmetic relationship established between the three tiers of blocks in FIG. 8 is visually depicted by the numerical values displayed upon the numeral pegs 16. Thus, for example, the blocks 10d and 10g of the second tier comprise, respectively, a value equivalent to one-fifth and four-fifths of the lower tier block 10h. Similarly, the top tier blocks 10e and 10f comprise, respectively, two-fifths and three-fifths the value of the lower tier block 10h and are also related to the second tier blocks 10d and 10g in a manner which will be obvious from the drawing.

The vertical pegs 28 serve to provide further physical representation of the arithmetic relationship involved herein. In addition to providing structural support, the pegs 28 will provide additional physical representation of the relative values sought to be depicted thereby enhancing the effectiveness of the device in portraying the arithmetic relationships involved. For example, a child may experiment with different numerical or arithmetic relationships by touching the pegs 28 and by removing and/or replacing various pegs to acquire understanding of the arithmetic processes.

It will, of course, be apparent that the numeral pegs 16 may be removed in a manner similar to that previously described. Thus, the stack of FIG. 8 may be held in place, with or without the vertical pegs 28 extending therethrough, with removal and replacement of the particular set of numeral pegs 16 serving to alter the specific numerical value of each of the blocks of the set without altering the overall relative arithmetic relationships involved. The numerical values of each of the pegs 16 of FIG. 8 may be doubled, halved, or made any integral multiple of the numbers shown without disturbing the basic relative relationships established. For example, the numeral pegs 16 shown in FIG. 8 could be replaced by similar numeral pegs containing on the faces thereof, respectively, the numbers "2" "4" "6" "8" and "10".

It will be seen that the interchangeability of the parts of the present invention will greatly enhance the versatility of the device as well as its effectiveness as an arithmetic teaching aid. Furthermore, versatility and interchangeability are accomplished in a manner which does not unduly complicate the structure of the device and which maintains at a minimum the manufacturing costs involved.

It is to be understood that many variations and modifications of the specific preferred embodiments described herein are possible within the knowledge of those skilled in the art without departure from the scope and purview of the present invention.

What is claimed is:

1. A manipulative arithmetic educational toy comprising, in combination:

a plurality of blocks each having a predetermined overall outer dimension, with the size of said dimension for each of said blocks being selected to establish a particular predetermined ratio relative to the size of said dimension for each of the other of said blocks, there being included in said combination blocks of different predetermined dimensions;

a plurality of indicia means each structured separately from said blocks and each having imprinted thereon a single visible numerical value designation; and means for removably individually mounting said indicia means upon said blocks;

said blocks being configured to permit stacking thereof in layers with said predetermined dimensions aligned relative to each other so that each layer of said stack is of an equivalent length in the direction in which said predetermined dimensions are aligned thereby to represent an arithmetic relationship between said layers of stacked blocks;

said plurality of indicia means being provided in sufficient number and with a sufficient variety of different numerical value designations such that each of the blocks in said stack may have removably mounted thereon one of said plurality of indicia means, with each of said indicia means numerically identifying with a specific numerical value, the predetermined dimension of said block upon which it is mounted, and with said indicia means bearing to each other the identical ratio which exists between the predetermined dimensions of the stacked blocks thereby to represent in specific numerical terms the arithmetic relationship existing between the predetermined dimensions of said stacked blocks;

and such that the specific numerical value of each of said stacked blocks may be changed by replacing each of said removable indicia means with another indicia means bearing a different numerical value designation without altering said stack or the relative arithmetic relationship which exists between the blocks of said stack.

2. A manipulative toy according to claim 1 wherein said blocks comprise a height dimension which is equivalent for each of said blocks and which extends transversely of said predetermined dimension, and a number of apertures extending through said block across said height dimension, said number of apertures being determined by said predetermined dimension for each of said blocks, with said apertures being located upon said blocks to become aligned when said blocks are placed to form said stack, said manipulative toy further comprising a plurality of pegs of a generally equivalent length adapted to be removably placed within said apertures to form a configuration of stacked pegs extending through said aligned apertures of said stacked blocks, each of said pegs being of a length having a dimension which bears a particular predetermined ratio to the height of said blocks, said ratio being such that the overall height of said stacked pegs extending through said aligned apertures will always be unequal to the overall height of said stack of blocks for all levels of a block stack below a predetermined maximum number of stacked block levels.

3. A manipulative toy according to claim 2 wherein said means for removably individually mounting said indicia means upon said blocks include openings formed within said blocks and sized to frictionally releasably engage said indicia means when said indicia means are placed therein.

4. A manipulative toy according to claim 3 wherein said indicia means comprise a forked configuraiton including a pair of resilient tangs, and wherein said openings in said blocks are sized to create a force flexing said tangs when said indicia means are placed therein, thereby to frictionally maintain said indicia means in said openings.

5. A manipulative toy according to claim 1 wherein said means for removably individually mounting said indicia means upon said blocks comprise magnetic means for magnetically releasably mounting said indicia means upon said blocks.

* * * * *